Sept. 30, 1969 R. H. AHRENS 3,470,338
PROGRAM CONTROLLER
Filed Oct. 3, 1966          9 Sheets-Sheet 1
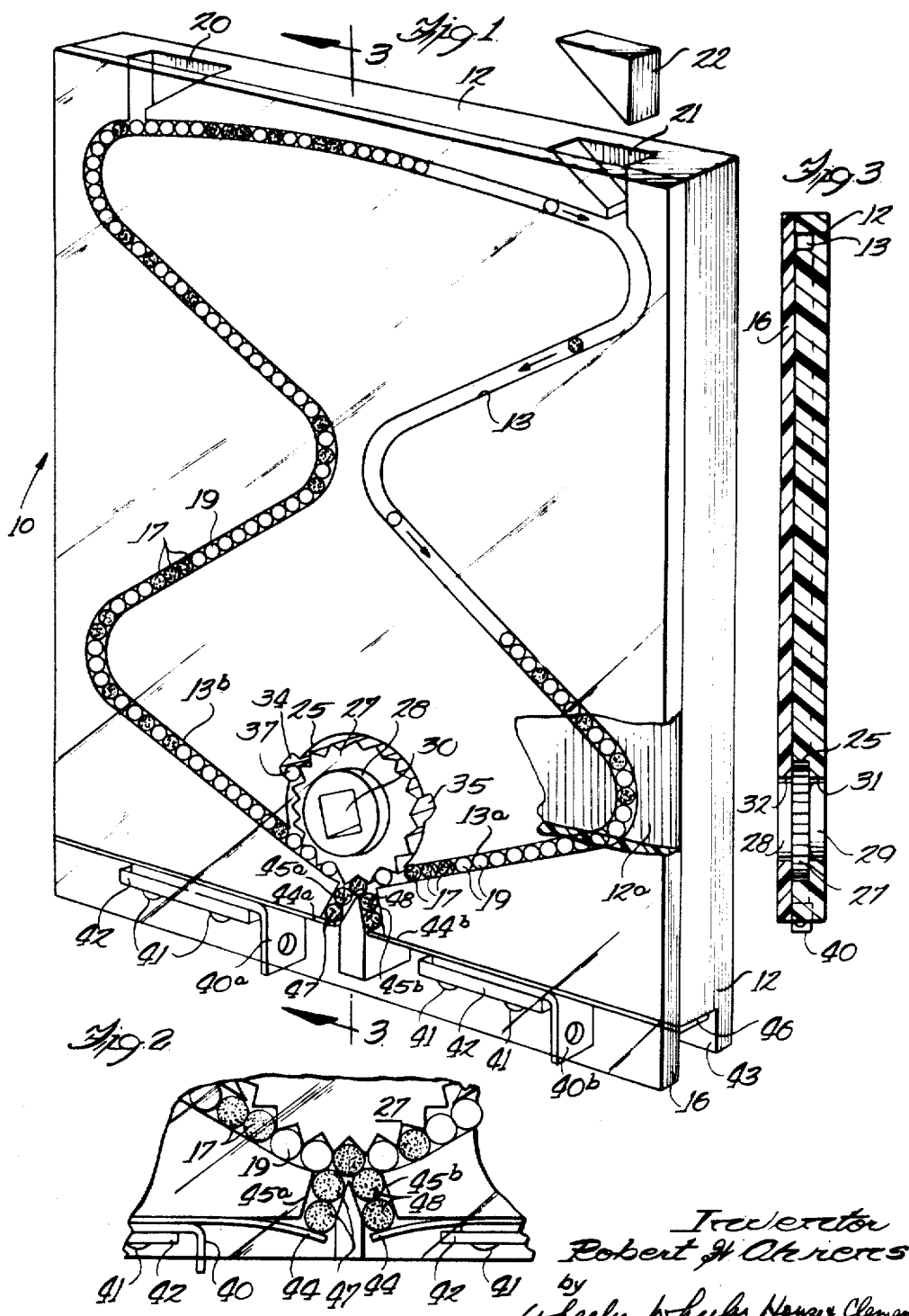

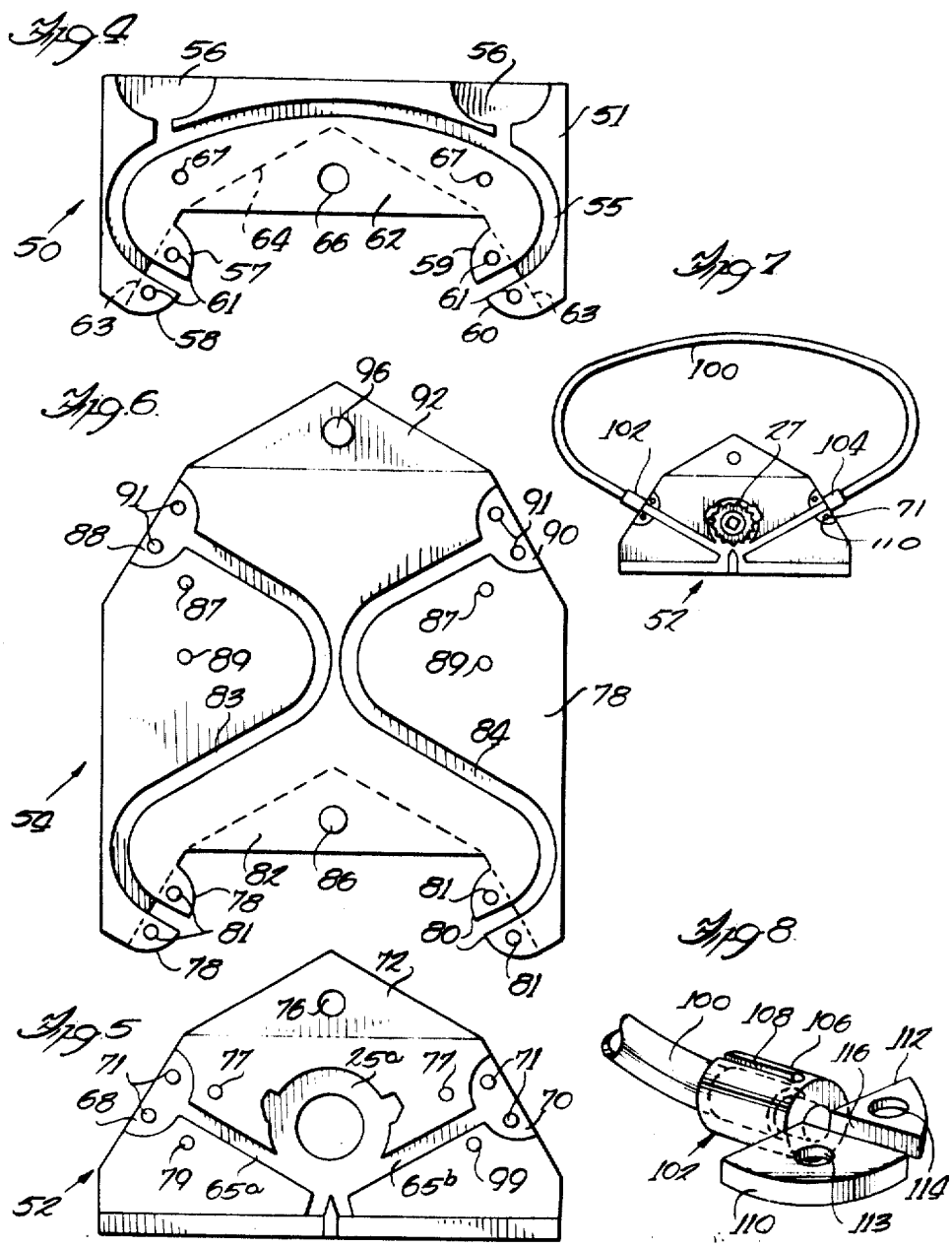

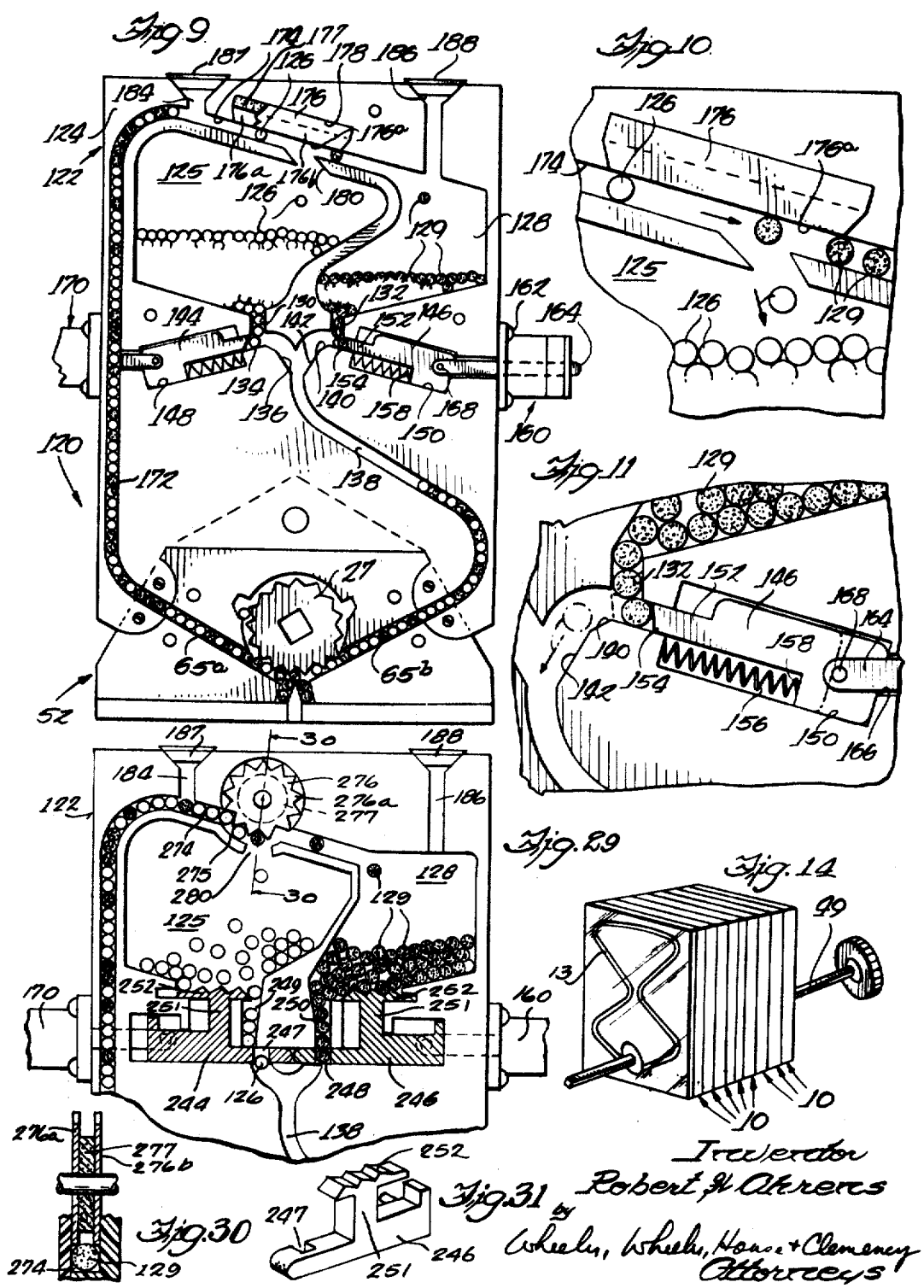

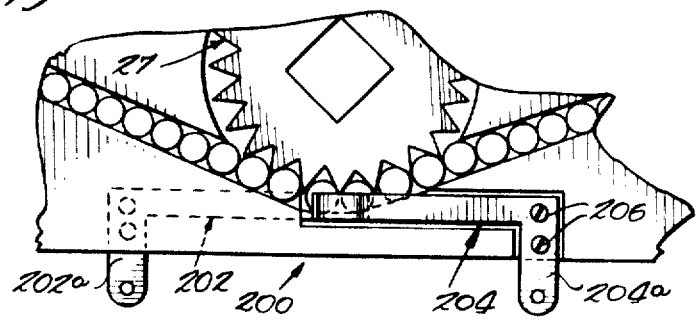
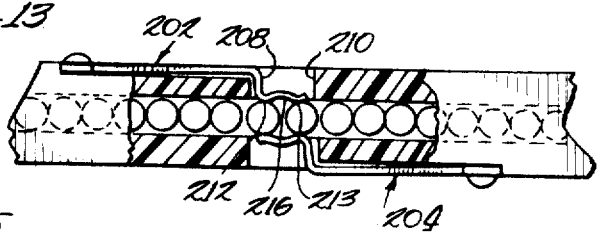
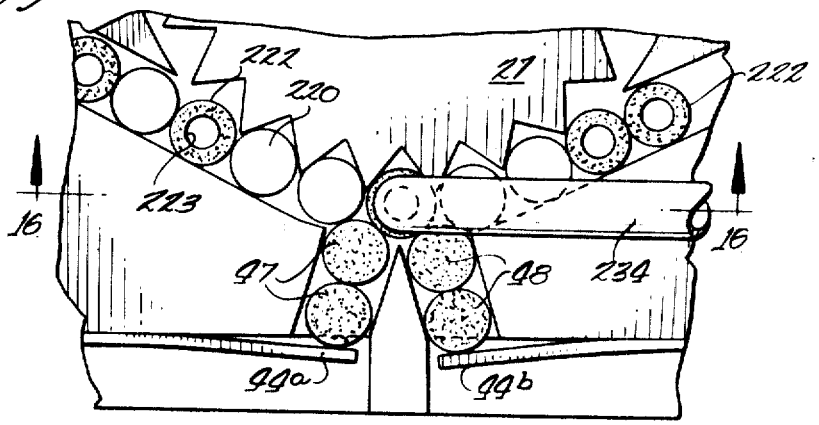
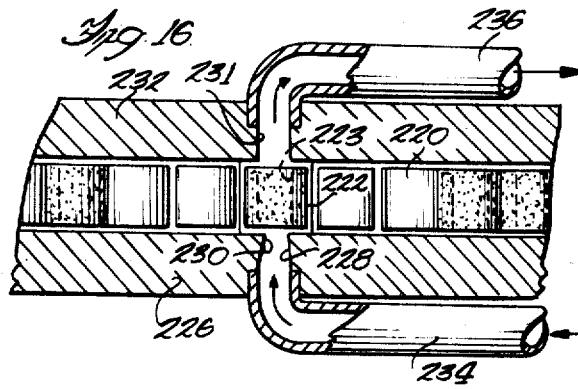

Inventor
Robert H. Ahrens
Wheeler, Wheeler, House & Clemency
Attorneys

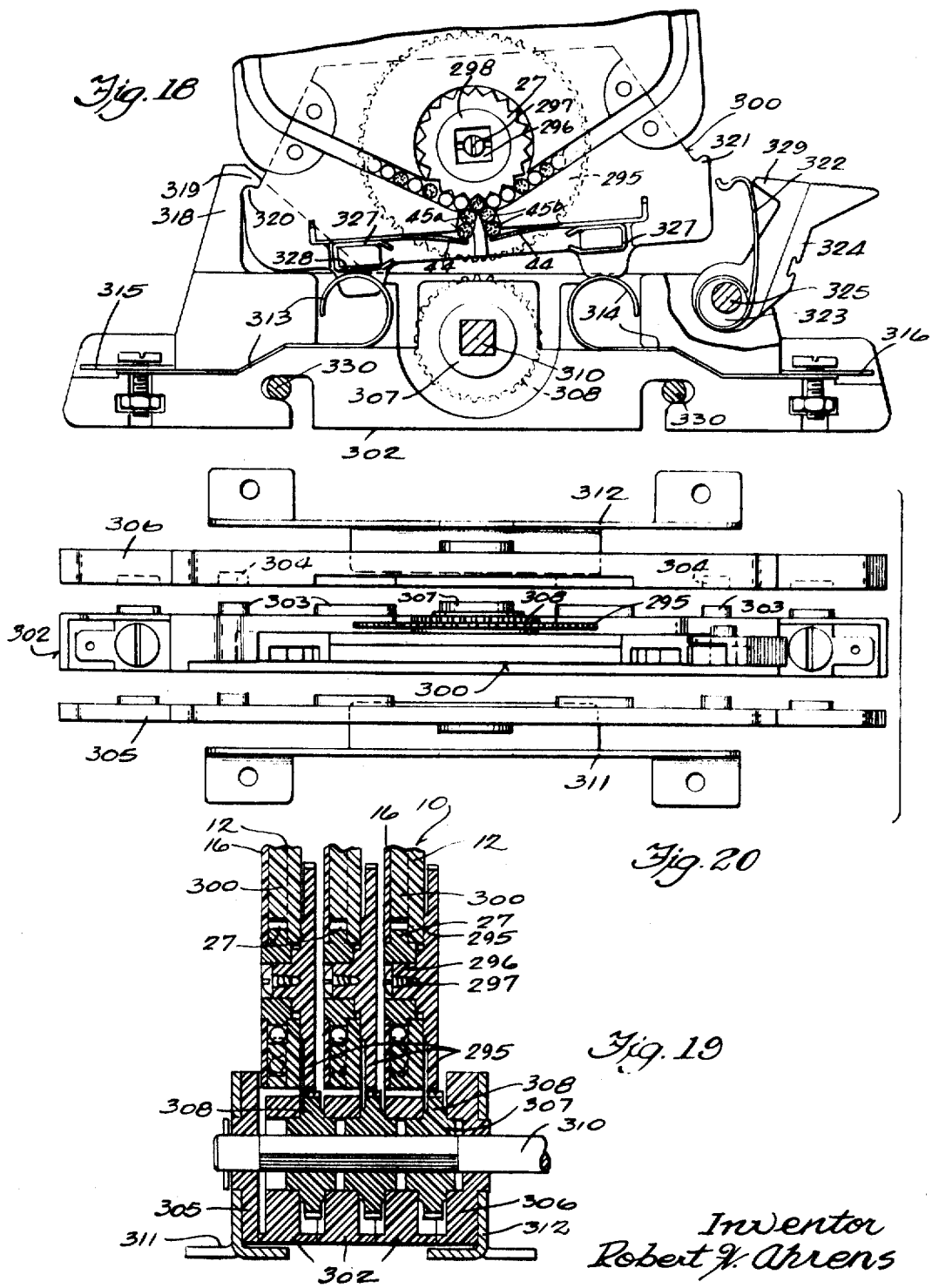

Sept. 30, 1969      R. H. AHRENS      3,470,338
PROGRAM CONTROLLER
Filed Oct. 5, 1966      9 Sheets-Sheet 7
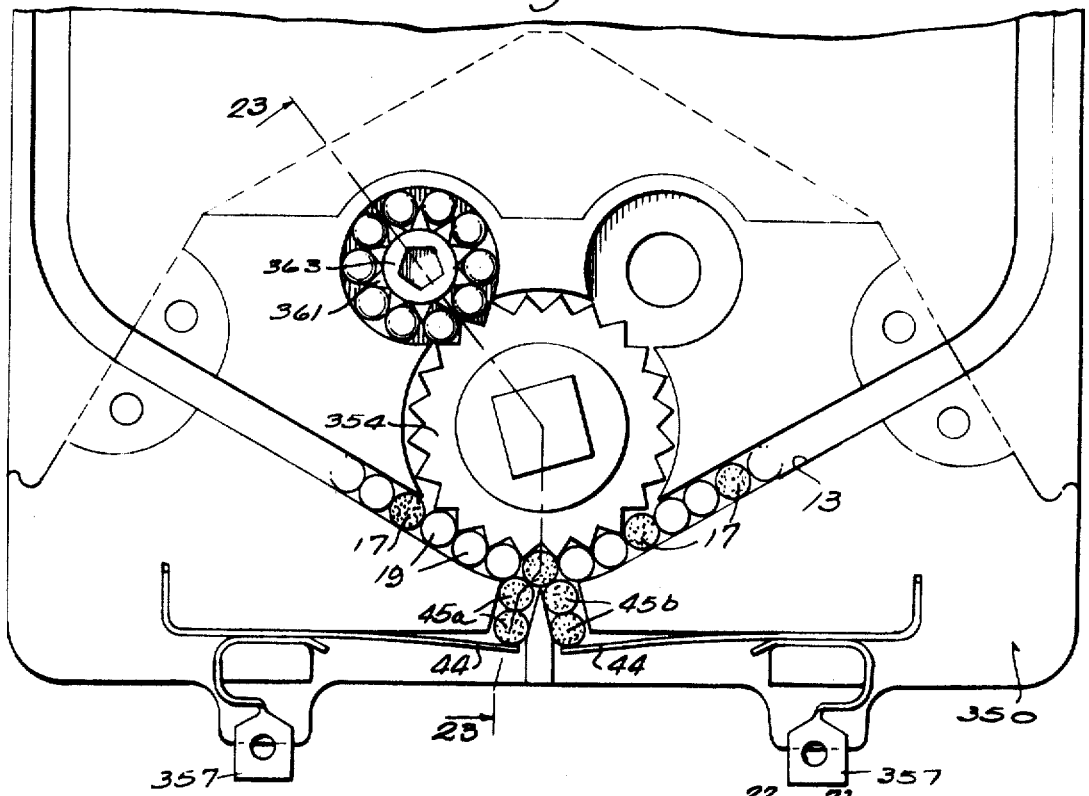
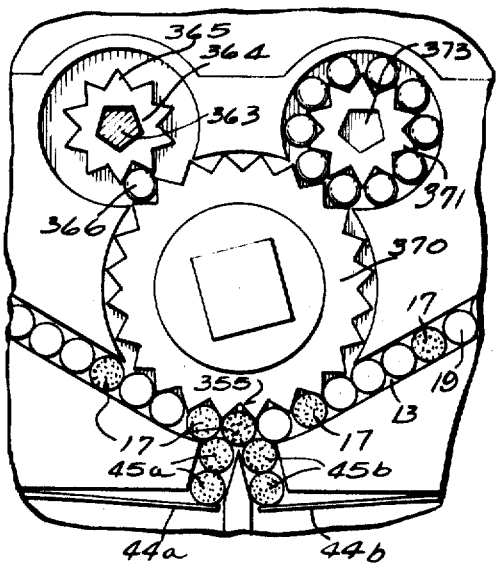
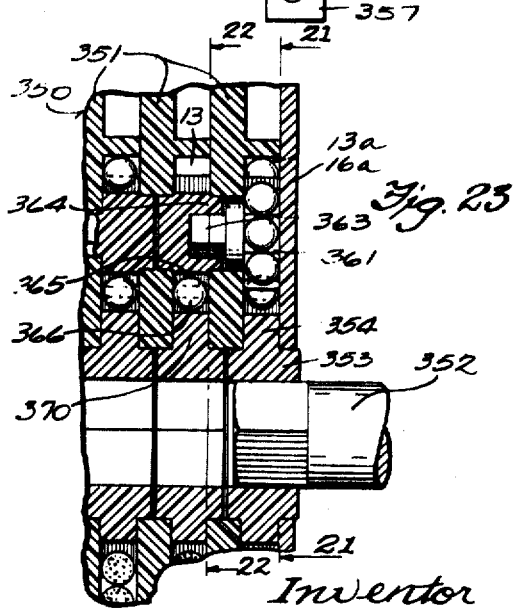
Inventor
Robert H. Ahrens
Wheeler, Wheeler, House & Clemency
Attorneys Sept. 30, 1969 R. H. AHRENS 3,470,338
PROGRAM CONTROLLER
Filed Oct. 3, 1966 9 Sheets-Sheet 8
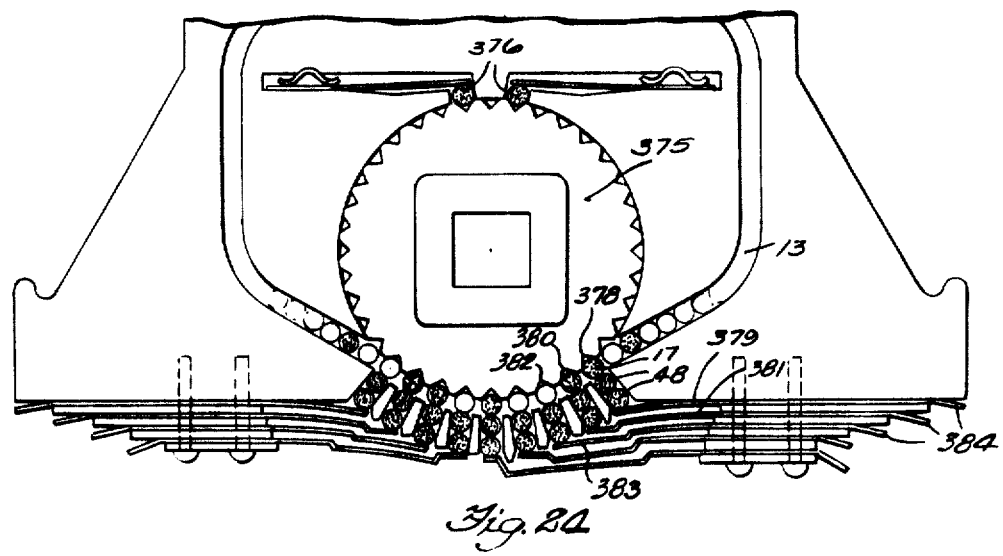
Fig. 24
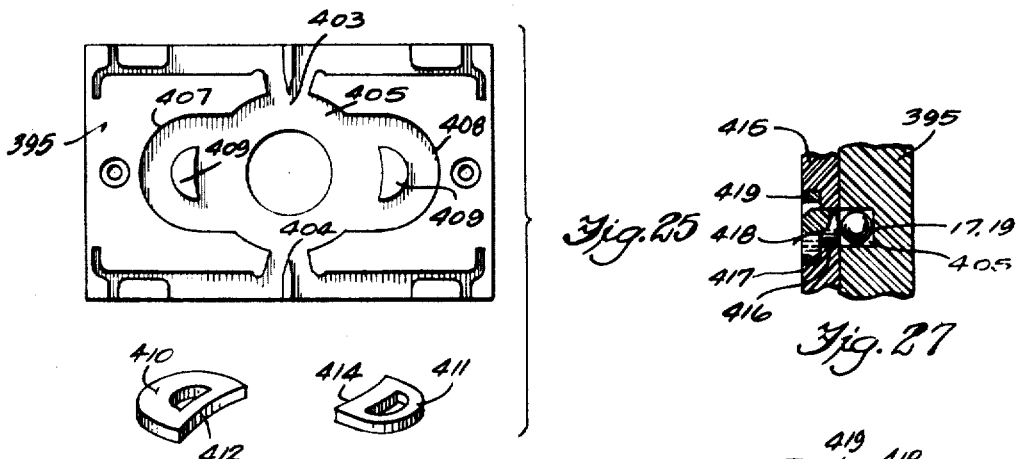
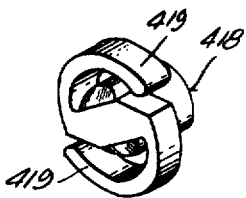
Fig. 27
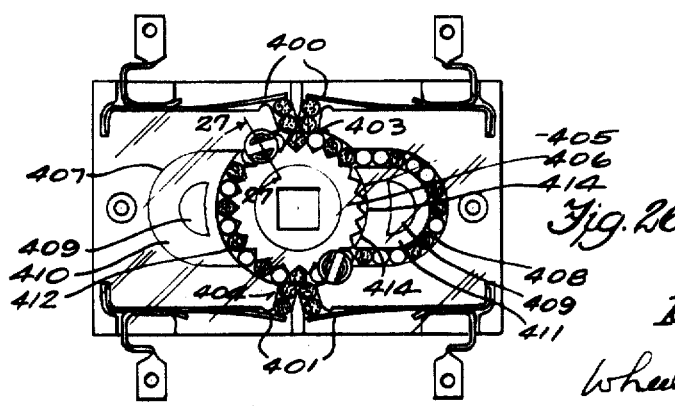
Fig. 28
Inventor
Robert H. Ahrens
Wheeler, Wheeler, House & Clemency
Attorneys

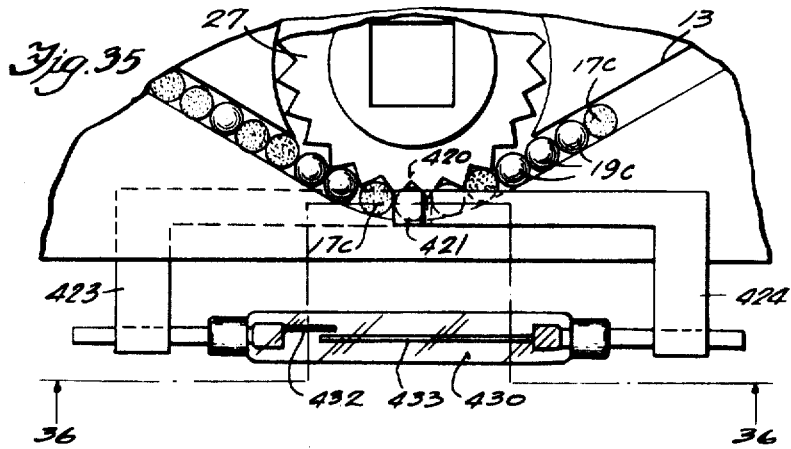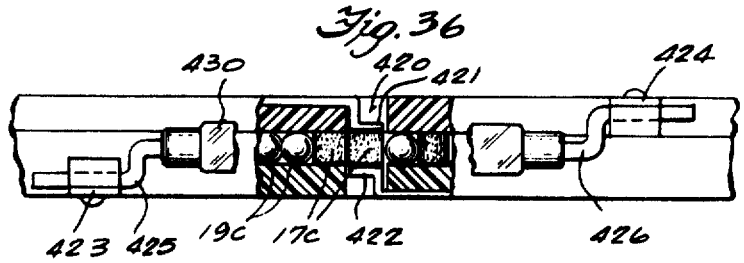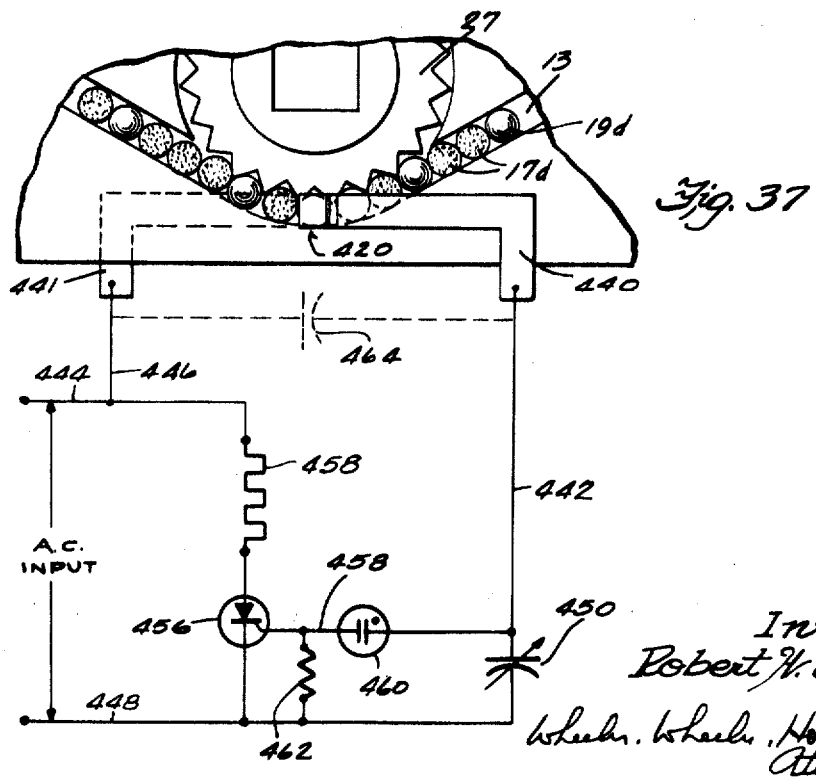

United States Patent Office 3,470,338
Patented Sept. 30, 1969

3,470,338
PROGRAM CONTROLLER
Robert H. Ahrens, Milwaukee, Wis., assignor to Milwaukee Chaplet & Mfg. Company, Inc., Milwaukee, Wis., a corporation of Wisconsin.
Continuation-in-part of application Ser. No. 498,580, Oct. 20, 1965. This application Oct. 3, 1966, Ser. No. 583,906
Int. Cl. H01h 43/08
U.S. Cl. 200—46                                21 Claims

ABSTRACT OF THE DISCLOSURE

One or more guide channels contains signal operating elements in pre-determined sequence with elements which do not operate the signal, all elements being of equal extent in the guide channel. The guide channel may either be circuitous to repeat the sequence of elements, or arranged to deliver the elements into hoppers in which they are segregated and from which they may be returned to the channel in any desired order, all elements being fed in sequence past a reading station, preferably by a star wheel or the like to enable determination of the capacity of the element at such station to effect signal response. It is contemplated that a number of series of such elements in modular assembly may be operated concurrently in correlated sequence.

---

The present invention relates in general to a device for storing information representative of a desired program and for reading out information to provide control signals for causing associated equipment to operate in accordance with the stored program. The invention relates more particularly to a new and improved program control device of the digital type in which each information bit is represented by one of a plurality of individual mechanical elements, which elements have different distinguishable physical properties and may have the shape of balls, cylinders, or other suitable configurations. The present application is a continuation-in-part of my application of like title, Ser. No. 498,580 filed Oct. 20, 1965.

In all of the various embodiments herein disclosed, the mechanical elements are not only fitted to the guide channel but are desirably of like extent longitudinally thereof. Thus, whether the elements are spherical or cylindrical; and regardless of their mass; or their electrical or magnetic or light conductivity; and regardless of their permeability, or other factors by which they may be distinguished physically, they have the significant advantage that a given number of elements will always occupy the same length of channel.

It is also true of all embodiments herein disclosed that information is stored by predetermining the sequence in which the physically distinguishable elements pass the sensing station.

In some of the embodiments, this sequence is repeated without intervening dwell and in these embodiments it is important that the series of elements need not fill the guide channel. Provided only that the number of elements is sufficient to fill the channel to the level of a high point therein, the individual elements passing that point will travel by gravity through the channel to the proper relationship with those that have preceded. This overcomes the objection to certain prior art devices in which it was necessary either to have a channel precisely corresponding in length to the sequence of elements or to use null elements to fill the channel, thus resulting in a dwell between the completion of one sequence and the initiation of the next.

In other embodiments of the invention in which the sequence is made up progressively during operation, it is likewise unnecessary that the elements fill the channel. In this type of organization the elements are sorted after use and each element is stored in a stock of elements of its own type. From these stocks of elements, individual elements are selectively fed into the channel to pass through the sensing station in the desired sequence.

In some embodiments herein disclosed, individual program storing modules are ganged together in any desired number, each being provided with its own sensing station, and the several modules being operated concurrently by a single driving shaft. In other types of program controllers herein disclosed, a somewhat similar assembly of modules is employed but motion transmission is effected from one controller to the next through incremental transfer gears which respond only after the passage of a given number of elements through the sensing station of each successive controller.

An object of the invention is to provide controllers of great versatility and adaptability for a wide variety of uses. Another objective is to minimize the amount of skill required of the operator. Still another objective is to minimize the need of peripheral programming equipment such, for example, as is required when punched tape is employed.

Other objects of the invention contemplate a new and improved electric switch for use when electrical conductivity distinguishes the element. Still another objective is to provide elements for use with a fluidic type of control system.

A still further object is to provide a whole series of associated sensing stations or multiple switching arrangements through which each element passes successively so that elements of the same series may operate a whole succession of responsive devices.

Briefly, the above and further objects are realized in accordance with the present invention by providing a controller employing a digital-type mechanical memory in which each bit is represented by a mechanical element retained in a passageway with similar elements. Preferably, the system is binary in nature, and therefore, each memory element has one of two different physical properties. For example, the elements may be either electrically conductive or electrically non-conductive; or they may be either perforate or imperforate; or magnetic or nonmagnetic; or light or dark in color. A sensor responsive to the properties of the elements is located adjacent to the passageway, and a driver is provided for moving the elements seriatim past the sensor thereby to provide output signals representative of the properties of the balls and of the stored program.

In order to enhance the versatility of a program controller embodying the present invention, various module components thereof are adapted to be interchangeably connected, thus enabling the use of a relatively few standard parts for innumerable applications. As more fully described hereinafter, several different novel structures are utilized to mechanize the controllers of this invention for manual, automatic and semi-automatic programming, and for facilitating the use of several such controllers with a complex synchronized program.

Further objects and advantages and a better understanding of the present invention may be had by reference to the following detailed description thereof taken in connection with the accompanying drawings, in which:

FIG. 1 is an isometric view, partly broken away, of a program controller embodying certain features of the present invention.

FIG. 2 is an enlarged, fragmentary, plan view of the drive and sensing portion of the controller shown in FIG. 1.

FIG. 3 is a cross sectional view on a slightly reduced scale of the device of FIG. 1 taken along the line 3—3 thereof.

FIG. 4 is an elevational view of a portion of a controller embodying the present invention.

FIG. 5 is an elevational view of a portion of a controller embodying the present invention and which is usable with the device of FIG. 4.

FIG. 6 is an elevational view of a portion of a controller and is adapted to be used in conjunction with the devices of FIGS. 4 and 5.

FIG. 7 is an elevational view of a program controller embodying another feature of the present invention.

FIG. 8 is an enlarged isometric view of one end of the external guide conduit employed in the device of FIG. 7.

FIG. 9 is an elevational view of another embodiment of the present invention.

FIG. 10 is an enlarged view of a portion of the device shown in FIG. 9 illustrating a magnetic assembly for automatically sorting magnetic and non-magnetic balls.

FIG. 11 is an enlarged view of another portion of the device of FIG. 9 particularly showing a part of the programming mechanism which functions to selectively inject balls into a guideway.

FIG. 12 is an enlarged fragmentary view of a program controller embodying the present invention and illustrating a make-before-break switch assembly.

FIG. 13 is a bottom view of the switch assembly shown in FIG. 12.

FIG. 14 is an isometric view of a plurality of program controllers of the present invention stacked together for synchronized operation.

FIG. 15 is a fragmentary view of a programmable fluidic control device embodying certain features of this invention.

FIG. 16 is a sectional view of the device of FIG. 15 taken along the line 16—16 thereof and illustrating the manner in which the flow of fluid is controlled by the type of storage element located at the sensing station.

FIG. 18 is a fragmentary detail view similar to FIG. 17 showing the module partially disassembled from the base.

FIG. 19 is a fragmentary detail view taken in section on the line 19—19 of FIG. 17.

FIG. 20 is a view showing in plan and in relatively disassociated positions some of the elements illustrated in FIG. 18, together with related parts.

FIG. 21 is an enlarged detail view on line 21—21 of FIG. 23 fragmentarily illustrating an embodiment equipped with incremental transfer gearing.

FIG. 22 is a fragmentary detail view taken in section on the line 22—22 of FIG. 23.

FIG. 23 is a fragmentary detail view taken in section on the line 23—23 of FIG. 21.

FIG. 24 is a view similar to FIG. 21 fragmentarily illustrating a multi-switch module for energizing a plurality of circuits in programmed sequence.

FIG. 25 shows in mutually separated position component parts of a multi-switch base with elongated storage channel.

FIG. 26 is a plan view of the mounting switch base as assembled.

FIG. 27 is an enlarged fragmentary detail view taken in section on the line 27—27 of FIG. 26.

FIG. 28 is a further enlarged detail view in perspective of a removable plug which gives access to an individual element in the channel.

FIG. 29 is a fragmentary detail view showing a modification of the structure of FIG. 9.

FIG. 30 is a view taken in section on the line 30—30 of FIG. 29.

FIG. 31 is a view in perspective showing on an enlarged scale a modified device for delivering a selected element into a desired program sequence.

FIG. 35 is a diagrammatic side elevational view fragmentarily illustrating a modified embodiment of the invention using magnetically responsive elements.

FIG. 36 is a view taken on the line 36—36 of FIG. 35.

FIG. 37 is a diagrammatic illustration similar to FIG. 35 showing a further modified embodiment of the invention using electrostatically operated means differentiating between dielectric and non-dielectric elements.

Figure 17:
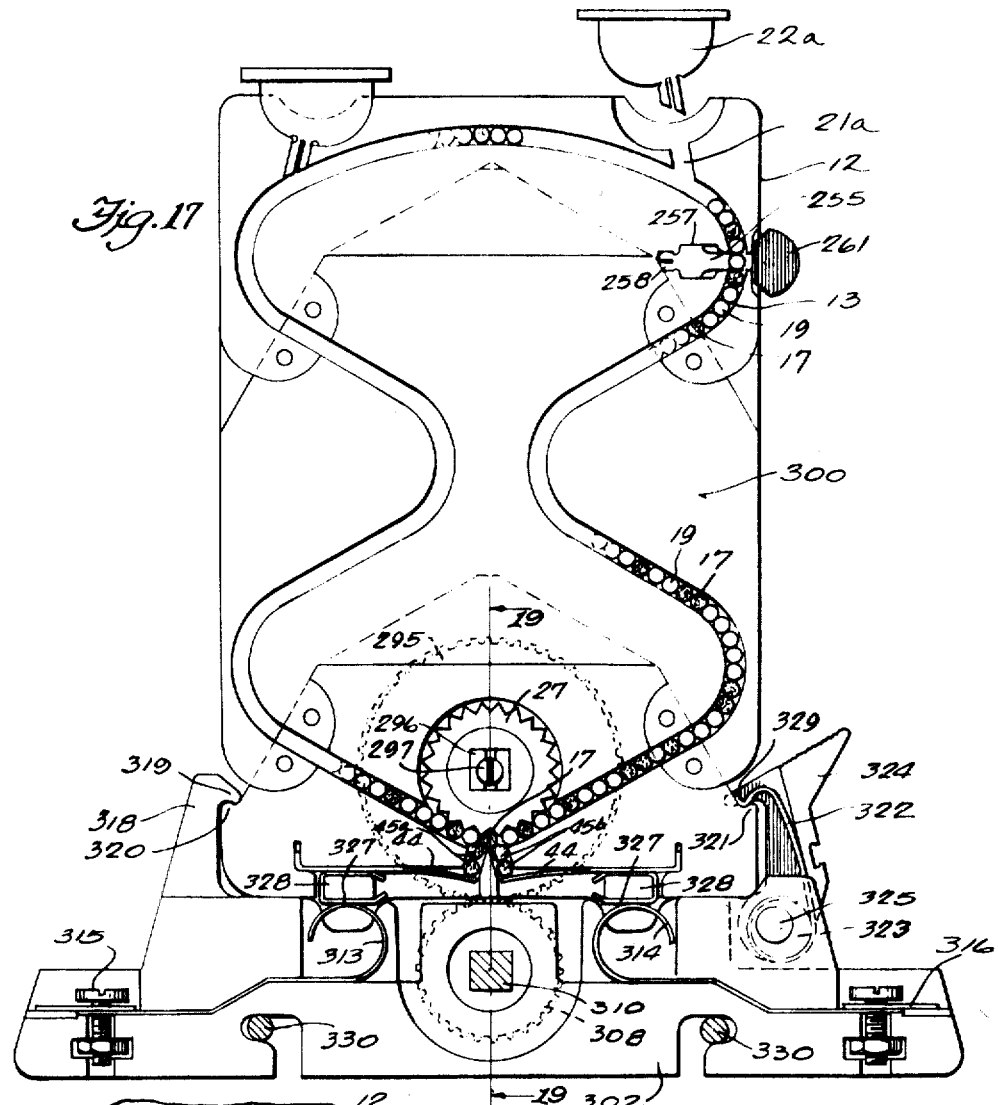
FIG. 17 is a view in side elevation of a program controller module detachably assembled upon a base which may comprise one unit to carry a single such module, or a number of units for a corresponding number of modules.

Referring now to the drawings, and more particularly to FIG. 1 thereof, there is shown a program controller 10 comprising a generally rectangular base plate 12 having a tortuous channel 13 formed in the forwardly facing surface 12a thereof. The channel 13 which provides a guideway and storage chamber for a plurality of mechanical storage elements 17 and 19, more fully described hereinafter, is square in cross section having a depth equal to its width. A rectangular cover plate 16 is fastened by suitable means (not shown) to the forward face 12a of the base plate 12 to cover the open channel 13 thereby to maintain the elements 17 and 19 in a predetermined sequential arrangement within the channel 13.

In the controller 10, the elements 17 and 19 are adapted to move along the channel 13 and they are preferably spherical or cylindrical in shape. In the drawings, however, the elements 17 and 19 are shown as spherical balls, all of the same diameter, which diameter is slightly less than the width of the channel 13 whereby the balls are free to roll along the channel. As will become apparent as this description proceeds, the controller 10 senses the electrical conductivity of the balls 17 and 19 to produce a train of time displaced electric pulses representative of the program stored in the controller. Accordingly, the balls 17 are electrically conductive and the balls 19 are electrically nonconductive. The sequential arrangement of the balls 17 and 19 in the channel 13 thus establishes the program which is stored in the controller 10.

In order to permit visual inspection of the stored program, either the base member 12 or the cover plate 16, or both, are preferably transparent and the balls 17 and 19 are visually distinguishable from one another. In one device built in accordance with the teachings of the present invention, the conductive balls 17 were formed of metal and the non-conductive balls 19 were formed of plastic whereby such balls were both optically and electrically distinguishable from one another.

As described hereinabove, a program is set up in the controller 10 by sequentially arranging the conductive and non-conductive balls 17 and 19 in a predetermined sequence corresponding to the desired program, and to facilitate the programming of the unit, a pair of feed openings 20 and 21 are provided at the top of the base member 12 and open into the channel 13. These openings 20 and 21 each have a relatively large mouth area to facilitate placement of the balls 17, 19 therein. Preferably, the balls will be inserted in one or the other of the feed openings 20 and 21 depending upon the direction in which the balls are driven through a sensing station located at the bottom of the unit. Suitable cover plugs 22 are provided for closing the openings 20 and 21 after the unit has been programmed and is ready for operation.

As indicated by the arrows in FIG. 1, the balls 17, 19 are adapted to move in a generally clockwise direction during operation of the unit, and therefore, the right hand feed opening 21 will preferably be used for programming the controller. Both openings 20 and 21 can be used for removing the balls 17, 19 from the unit. The channel 13 which forms the guideway for the storage elements 17 and 19 is more or less in the shape of a figure eight to provide adequate storage space in a relatively small unit. Where a greater storage capacity is required, additional bends may be provided in the channel 13. In the controller 10, the balls 17, 19 are adapted to be fed to the driving mechanism at the sensing station under the force of gravity. Hence, the lower portions 13a and 13b of the channel 13 slope downwardly and meet at the lowest point of the channel 13 in the unit. This is the sensing station at which the conductivity of the balls are sensed.

In order to drive the balls one by one into and out of the sensing station, a drive sprocket 27 having axially disposed hub portions 28 and 29 on opposite sides thereof is rotatably mounted in a circular recess 25 in the base member 12. The recess 25 has a depth equal to that of the channel 13, and the hub 29 is journaled in a bore 31 formed in the base member 12 concentric with the recess 25. In like manner, the hub 28 on the sprocket 27 is journaled in an aligned bore 32 in the cover plate 16. A square opening 30 extends axially through the sprocket 27 for receiving a correspondingly shaped drive shaft (not shown in FIG. 1). Rotation of the drive shaft thus rotates the sprocket 27 to move the balls 17, 19 through the sensing station.

As shown, the sprocket 27 has a plurality of V-shaped teeth defining V-shaped recesses for receiving the balls 17, 19 and for moving them along the channel 13 as the sprocket 27 is rotated.

In order to sense the conductivity of the lowermost ball in the channel 13, which ball is in the sensing station, there is provided a switch assembly including a pair of generally L-shaped electric terminal members 40a and 40b which are secured to the base member 12 by means of a plurality of screws 41 and a pair of insulating brackets 42. The base member 12 is provided with a rectangular notched-out portion 43 along its lower edge which cooperates with the overlying depending portion of the cover plate 16 to provide a generally rectangular cavity in which the terminals 40a and 40b are disposed, thereby to protect the switch assembly from damage. A pair of conductive leaf springs 44a and 44b are mounted along the lower edge 46 of the base member 12 and overlie the open lower ends of a pair of channels 45a and 45b provided in the forward face of the base member 12. The channels 45a and 45b converge toward the center of the storage ball 17, 19 located at the sensing station. A plurality of conductive contact balls 47 and 48 are respectively disposed in the channels 45a and 45b and are resiliently urged by means of the resiliency of the leaf springs 44a and 44b into engagement with the ball 17, 19 positioned in the sensing station. Good electrical contact between the springs and the ball at the sensing station is thus assured and, in addition, a detent is provided for maintaining the sprocket 27 in such position as to maintan the one of the balls 17, 19 in the sensing station in engagement with the contact balls 47 and 48.

The conductive balls 47 and 48 normally remain in channels 45a and 45b, where they serve as rolling and floating contacts engaging respective leaf springs 44a and 44b. A circuit is completed through these balls 47, 48 and between springs 44a and 44b by an electrically conductive ball 17 which happens to lie at the sensing station. Firm contact is secured by the bias of the springs. Obviously, when a non-conductive ball 19 is at the sensing station, the circuit between these springs is open.

The fact that the balls 47 and 48 tend to roll with each advance of an element through the sensing station results in continuous change of the electrical surfaces which are in contact with each other, thus avoiding pitting and corrosion. In addition, whenever the device has been emptied of balls (as for the purpose of changing the program), the balls 47 and 48 will likewise be discharged. When a new program is set up, the first four balls introduced into the channel should be conductive balls because the first four balls entering the sensing station will drop into the channels 47 and 48. Thus, the device is constantly presenting new contacts at the sensing station. While I may use one ball in each channel, or more than two, if desired, the use of two balls in each channel is shown as a preferred arrangement.

It will be apparent that the program controller 10 is symmetrical about the central vertical axis thereof so that the balls 17, 19 may be driven in either a clockwise or counterclockwise direction. However, once the unit has been programmed, it is ordinarily imperative that it be operated in only one direction, i.e., either clockwise or counterclockwise. Therefore, in order to prevent spurious rotation of the sprocket 27 in the wrong direction, a pair of sockets 34 and 35 are provided in the base member 12 adjacent to the sprocket recess 25 and a ball 37 is disposed in one or the other of the sockets 34, 35. As shown in FIG. 1, the ball 37 is located in the left hand socket 34 whereby counterclockwise rotation of the socket is prevented and clockwise movement of the balls 17 and 19 through the sensing station is assured. Had a counterclockwise movement of the balls 17, 19 been desired, the ball 37 would have been placed in the socket 35. In operation, clockwise rotation of the sprocket 27 causes the ball 37 as shown in FIG. 1 to move upwardly into the socket 34 out of engagement with the sides of the sprocket teeth, thus permitting the sprocket teeth to pass the ball 37. When the rotation of the sprocket 27 is stopped or reversed, the ball 37 falls by gravity to the bottom of the socket 34 so as to become wedged between the bottom surface of the socket and the lower surface of the adjoining sprocket tooth thereby preventing counterclockwise rotation of the sprocket.

By using either balls or cylinders for the storage elements in the channel 13, rolling contact between the elements being sensed and the contact balls or cylinders 47, 48 is assured so that the effects of surface oxidation on the conductive balls is minimized and long accurate life of the unit is assured.

In the embodiment of the invention illustrated in FIG. 1, the program will be repeated if the number of balls 17, 19 employed are a few in excess of the number required to fill one-half of the channel 13. It may also be seen that if the channel 13 is not entirely filled with the balls 17, 19, a gravity feed to the drive sprocket 27 results. Where the unit 10 can be mounted in a vertical position as shown, a gravity feed is generally satisfactory. Wherehowever, the unit must be mounted horizontally, then it is necessary to completely fill the channel 13 with balls whereby the balls are driven around the channel 13 solely under the influence of the drive sprocket 27.

It is a feature of the present invention that program controllers embodying the invention designed for use in complex switching programs can be fabricated in relatively small sizes. For example, the program controller 10 can be constructed using a base plate which is six inches by four inches by one-quarter inch in external dimensions. The channel 13 may have a depth of 0.135 inch and the drive sprocket may be approximately one inch in diameter. It is also a feature of the present invention that the unit may be manufactured at a relatively low cost. Accordingly, the base plate 12 and the cover plate 16 can be formed of a suitable plastic using conventional injection molding technique. The drive sprocket 27 may also be formed of plastic as can the non-conductive balls 19.

Preferably, the conductive elements 17 are made of metals appropriate for the load such as silver or copper alloys and may be gold plated to resist oxidation.

By way of example and not by way of limitation, it may be noted that, although the number of teeth provided on the sprocket 27 is not critical, it has been found that a sprocket having twenty-four equally spaced V-shaped teeth is satisfactory, and where the balls 17, 19 have a diameter of one-eighth inch, the sides of adjacent teeth may form a 90° angle with the base-to-tip dimension of each tooth being 0.43 inch. The 90° angle is preferred regardless of ball diameter. As for the teeth, it has been found that a 15° angle between teeth is a very satisfactory angle and twenty-four is a number which is divisible by many numbers and which matches available stepping devices for the operation of the driving shaft.

Ordinarily, the program controller 10 is used for controlling the operation of a single associated device, and therefore, in most applications a plurality of the program controllers 10 are utilized. In such cases, a plurality of the units 10 will be stacked in face-to-face relationship as shown in FIG. 14 with the sprockets 27 in alignment to receive a single drive shaft 49. Accordingly, the separate units 10 are operated in mutual synchronism and synchronized operation of the respectively controlled associated devices will thus be achieved. When the units 10 are thus used in stacked relationship, the cover plates 16 may be eliminated since the rear face of the base plate of one unit may function as the cover plate of the next adjacent unit. Hence, a savings in both cost and space may be achieved. In those applications where visual inspection of the program may be necessary, it will be understood that the cover plates 16 are required, thereby permitting the stacked units to be pushed apart to permit inspection of the program in question.

Those skilled in the art know that there are many applications for a program controller constructed in accordance with the teachings of the present invention, and that such programs may be simple or complex, short or long. By way of example, and not by way of limitation, reference is made to automation of special-purpose machinery and of batch operations. In order to enable the utilization of a relatively small number of different parts for assembling controllers which meet the needs of a wide variety of different applications, there is provided in accordance with one feature of the present invention a program controller utilizing a plurality of interconnectable module elements. As shown, the elements of FIGS. 4 and 5 may be assembled together to form a complete program controller or the module elements of FIGS. 4, 5 and 6 may be assembled to provide a controller having a greater storage capacity.

In FIG. 4 there is shown a cap module element 50, in FIG. 5 there is shown a base module element 52, and in FIG. 6 there is shown an intermediate module element 54. The intermediate element 54 may be connected between the elements of 50 and 52 in order to accommodate a relatively large program or the intermediate module 54 may be eliminated where the program is relatively small. Where an exceedingly large program is involved, two or more of the intermediate module units 54 may be employed.

Referring now to FIG. 4, it may be seen that the cap module 50 comprises a sheetlike base member 51, which may be formed of nylon or other suitable material, and includes a channel 55 which is square in cross section. The channel 55 thus provides a guideway for the mechanical storage elements of the unit. A pair of feed openings 56 having enlarged mouth portions are provided at the top of the member 51 and open into the channel 55 near the opposite side edges of the member 51.

In order to facilitate connection of the cap module unit 50 to either the base unit 52 of FIG. 5 or the intermediate unit 54 of FIG. 6, a pair of mounting tabs 57 and 58 are provided at the left hand lower side of the member 51 and a similar pair of mounting tabs 59 and 60 are provided at the lower right hand side of the member 51. The tabs 57 and 58 and the tabs 59 and 60 are respectively located at the ends of the channel 55 and are spaced apart by an amount equal to the width of the channel 55 thereby to provide extensions of such channel. In order to facilitate centering and locking of the module 50 to either the base module 52 or the intermediate module 54, the rear portion of the tabs 57, 58, 59 and 60 and a triangular portion 62 of the base member 51 have a reduced thickness and a plurality of holes 66 and 61 are provided in the base member 51 for receiving suitable fastening members for attaching the cap module 50 to an associated module. A plurality of holes 61 respectively provided in the tabs 57, 58, 59 and 60 are also adapted to receiving suitable fastening devices. Dowels or pegs 71 and 91 hold the parts in registry.

Referring to FIG. 5, it may be seen that the base module 52 includes an upper triangular portion 72 of reduced thickness which corresponds in shape to the triangular portion 62 of the cap module 50 and has a thickness equal to the depth of the recess provided at the rear of the triangular portion 62. Also, a peg 76 corresponds in size and position to the hole 66 in the member 51 so that a common fastening device may be used to attach the two parts together. The forward face of the base module 52 has a pair of channels 65a and 65b which are adapted to mate in endwise engagement to the channels provided between the tabs 57, 58, 59 and 60 of the cap module 50 when such tabs are received in a pair of arcuate recesses 68 and 70 formed in the forward face of the base module 52. A plurality of pegs 71 are provided in the recessed portions 68 and 70 for press fit in the apertures 61 in the cap module 50 for locking the modules together. As shown, the bottom module 52 includes the circular recess 25a for receiving a drive sprocket such as that shown at 27 in the unit of FIG. 1. In other respects, the module 52 incorporates the same switching elements as does the unit 10.

It may be seen that with the cap module 50 connected directly to the bottom module 52, there is provided a relatively small guideway for holding the mechanical storage elements which may be arranged therein in accordance with the desired program.

In order to increase the capacity of the program controller, the intermediate member 54 shown in FIG. 6 may be connected interchangeably between the cap member 50 and the base member 52.

As shown in FIG. 6, the intermediate member has a recess 82 apertured at 86 and designed to receive the reduced thickness top portion 72 and peg 76 of the base member in the same manner as these parts engage recess 62 and aperture 66 of the cap member.

In like manner, the tabs 78 and 80 of the intermediate member engage in the recesses 68 and 70 of the base member, pegs 71 of the base member being received into apertures 81 in the tabs of the intermediate member 54.

The reduced thickness extension 92 of the intermediate member corresponds with the corresponding part 72 of the base member and has a corresponding peg 96 like peg 76 of the base member. These parts engage in the recess 64 of the cap member 50, peg 96 being engaged in aperture 66 of the cap member. The tabs 57, 58 of the cap member 50 will then be engaged in recess 88 of the intermediate member, while tabs 59, 60 of the cap member will be engaged in recess 90 of the intermediate member. The pegs 91 of the intermediate member will then enter the holes 61 of the cap member.

When this assembly is complete, the channels 83, 84 of intermediate member 54 will be connected in series between the respective channels 65a and 65b of the base member and the guideway channel 55 of the cap member.

It will be understood that with the drive sprocket and electric switching assembly in place, a suitable cover member is secured over the several channeled members, as in FIG. 1.

Referring now to FIG. 7, there is shown another embodiment of the present invention employing the base member 52. In place of the intermediate and cap members 50 and/or 54, there is provided a guide tube 100 having a pair of connectors 102 and 104 press-fitted over the respective ends thereof. As best shown in FIG. 8, each of the connectors 102 and 104 includes a counterbored bushing portion 106 provided with a longitudinal slit 108 for tightly receiving the associated end of the tube 100. Also, the connectors 102 and 104 are provided with a pair of integral tab portions 110 and 112 which are provided with mounting holes 113 and 114, respectively. When the tab portions 110 and 112 of the connector 102 are positioned in the recess 68, for example, the openings 113 and 114 are aligned with the pegs 71. In addition, the passageway 116 provided between the tabs 110 and 112, and which is aligned with the bore of the tubular portion 106, is aligned with the channel 65a in the base module 52. By using tubes 100 having different lengths, the storage capacity of the program controller of FIG. 7 may be readily adjusted. In order to program the unit of FIG. 7, one of the tabs 102 or 104 is removed and the program is set up by depositing balls in the tube in the desired sequence. Also, preprogrammed tubes may be used so that the program can be readily changed by merely removing one tube with its associated balls and replacing it with another. The tube will not necessarily be filled, in which case feed is by gravity.

In the several different embodiments of the invention heretofore described, the program controllers are programmed by manually inserting the mechanical storage elements into appropriate feed openings. While this type of programming is satisfactory for many applications, there are many uses for program controllers embodying the present invention where manual loading of the storage elements into the unit is not practical. For instance, the program controllers may not be readily accessible, thereby making manual loading difficult, if at all possible, or the environment may be such that the controllers should be sealed from the ambient atmosphere to prevent corrosion of the storage elements.

Referring to FIG. 9, there is illustrated a program controller 120 utilizing the base module 52, more fully described in connection with FIG. 5, and a solenoid-programmed cap module 122. As shown, the modules 122 and 52 are adapted to be connected together in the same manner in which the modules 52, 54 and 50 are connected together. In FIG. 9, the unit is shown with the cover plate removed, but it will be understood that a cover plate or the rear portion of a similar unit is disposed against the forward face of the controller 120 during operation to maintain the storage balls in proper position in the unit, and to hold the drive sprocket 27 in place.

As shown in FIG. 9, the cap module 122 includes a base plate 124 provided with a first recessed area 125 for storing a plurality of non-conductive balls 126 and a recessed area 128 for storing a plurality of conductive balls 129. The program controller 120 is designed for operation in a vertical position, and therefore, the walls of the reservoir chamber 125 slope downwardly to a feed opening 130 at the bottom. The opening 130 has a width slightly greater than the diameter of the balls 126 so that they may pass therethrough one by one. Similarly, the walls of the reservoir chamber 128 also slope downwardly at the bottom to a feed pasageway 132, also having a width slightly greater than the diameter of the balls 129 so that the conductive balls 129 may pass one by one through the opening 132. Directly beneath the opening 130 through which the non-conductive balls 126 pass is provided a channel 134 sloping upwardly toward the center of the unit. Connected to the upper end of the channel 134 is a downwardly sloping channel portion 136 feeding into a guideway 138 which communicates with the guideway 65b of the base module 52. In like manner, a channel 140 sloping upwardly toward the center of the unit is disposed directly beneath the opening 132 through which the conductive balls 129 fall under the influence of gravity and the channel 140 opens into a downwardly sloping channel 142 which meets with the channels 136 and the guideway 138.

In order to selectively feed the balls 126 and 129 into the guideway 138, in order to establish a desired program, a pair of feed plungers 144 and 146 are respectively mounted in suitable recesses 148 and 150 in the base plate 124 adjacent to the channels 134 and 140. The plungers 144 and 146 are identical in construction and operation, and therefore, only the unit 146 is described in detail herein.

As shown, the plunger 146 includes a finger 152 having a width substantially equal to that of the channel 140 and tapered forward end 154 for engaging the ball 129 which is located in the channel 140. The plunger 146 is biased rearwardly against the rearward wall of the recess 150 by means of a coil spring 156 compressed between the forward edge of the recess 150 and a shoulder 158 on the plunger. A solenoid 160 is suitably mounted as by means of a plurality of mounting screws 162 to the right hand edge of the base plate 120 as shown in FIG. 9, and includes a linkage arm 164 connected to the armature of the relay so as to be reciprocated upon successive actuations of the solenoid 160. The linkage arm 164 extends through a slot 166 provided between the base plate 124 and the associated cover and is pivotally connected to the plunger 146 by means of a suitable pintle 168. In operation, when the solenoid 160 is energized the linkage arm 164 is moved inwardly to push the plunger 146 against the force of the spring 156 whereby the finger 152 pushes the ball 129 located in the channel 140 into the adjacent channel 142 from which it falls under the force of gravity into the guideway 138. The passageways 132 and 140 and the finger 152 are arranged such that one ball 129 only is fed to the channel 138 each time the solenoid 160 is energized. In like manner, energization of a solenoid 170 connected to the plunger 144 pushes a nonconductive ball 126 from the channel 134 into the channel 136 from which it falls by the force of gravity into the guideway 138. It may thus be seen that selective energization of the solenoids 160 and 170 delivers selected balls into the guideway to set up a desired program to be stored in the unit 120.

After the balls have been sensed and passed through the channel 65a in the base module 52, they are fed into a return channel 172 formed in the base member 124 and pass into a downwardly sloping sorting channel 174. The sorting channel 174 has a width substantially equal, but slightly greater than, the diameter of the balls 126 and 129 and a permanent magnet 176 is mounted in a recess 178 adjacent to the upper side of the channel 174 so that the oppositely magnetized side flanges 176a and 176b extend along the top of the channel 174 to provide support for the magnetic balls so that they will span the opening 180 through which the non-magnetic balls drop into the storage chamber 125. The side flanges of magnet 176 may comprise poles magnetized by any desired means such as the ceramic bar magnet 177. The magnetic balls, having cleared the opening 180, will drop, as shown at 129, into the storage reservoir 128.

In order to permit the initial filling of the storage chambers 125 and 128, there is provided a pair of feed openings 184 and 186. The opening 184 opens into the channel 174 and the opening 186 opens directly into the chamber 128. These feed openings are normally closed by means of a pair of plugs 187 and 188, respectively. It will be understood that only the magnetic balls will be placed in the opening 186.

A preferred alternative arrangement is shown in FIG. 29 on Sheet 3. As there shown, the channel 274 is arcuately curved at 275 concentrically with the star wheel magnet 276. This magnet comprises a pair of polar star wheels 276a and 276b laminated upon a ceramic disk magnet 277 which is polarized perpendicular to its face so that a magnetizable ball 129 will cling to the star wheel magnet 276 for rotation therewith across port 280 as shown in FIGS. 29 and 30. As the star wheel clears the port 280, the ball 129 is stripped from it for delivery into chamber 128.

FIGS. 29 and 31 also show an alternative arrangement for delivering balls from the storage hoppers 125 and 128 into the channel 138. The respective slide valves 244 and 246 have channels 247, 248 which are selectively registrable with channels 249, 250 respectively leading from the storage chambers 125, 128. In the retracted position in which the slide valve 246 is shown, it has received a magnetic ball 129 from the chamber 128 but delivery of the ball into the channel 138 is not possible for lack of registry. On the other hand, the channel 247 of slide valve 244 has now moved out of registry with channel 249. The non-magnetic ball 126 which it received when in registry with channel 249 is being discharged into the channel 138. The two slide valves touch each other and consequently only one can register with a branch of the channel 138 at any given time. However, either slide valve may be retracted and advanced as often as required to introduce as many elements of one type into channel 138 as may be needed in a particular sequence. Moreover, only one element can be delivered by the slide valve in any given registry thereof with channel 138.

The solenoids 160, 170 operate the respective slide valves as already described so that, simply by energizing the solenoids in proper sequence, any desired combinations of elements can be stored in channel 138 for delivery to the sensing station.

To prevent the elements from bridging across the respective delivery channels 249 and 250 where these open from the respective chambers 125 and 128, the respective slide valves are preferably provided with upstanding posts 251 having toothed heads 252. With each operation of a slide valve, these heads agitate the elements in the respective chamber, thus effectively precluding bridging.

Figure 32:
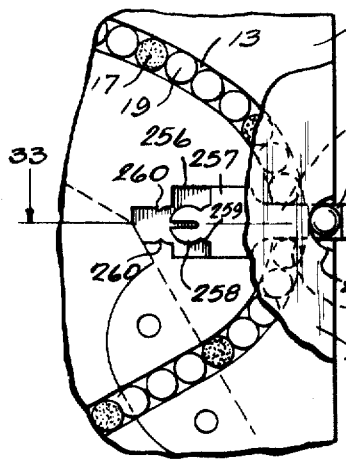
FIG. 32 is a view partially in side elevation, with a cover plate fragmentarily shown, to illustrate a slide valve for modification of a stored program to the extent of removing or substituting a single element.
Figure 34:
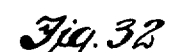
FIG. 34 is a view taken in section on the line 34—34 of FIG. 33.
Figure 33:
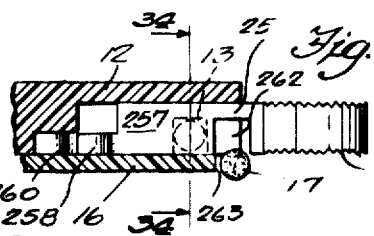
FIG. 33 is a view taken in section on the line 33—33 of FIG. 32.

If it be desired to replace one or more elements of a given sequence, without preparing a completely new sequence of elements, this can readily be done by the means best shown in FIGS. 32 to 34 (Sheet 5).

Any of the base plates 12 having a channel 13 is covered with the closure plate 16, which is preferably transparent so that the entire program as set up in the channel is readily visible. The base plate has a slot 254 which intersects the channel 13 and in which the slide valve 255 is reciprocable. The slot is enlarged at 256 to receive the slide 257. This slide carries a split resilient head 258 having a neck portion 259 normally retained by lugs 260 but yieldably releasable therefrom when the slide valve is withdrawn outwardly my manipulation of the handle 261.

In the normal innermost position of the slide valve, as shown in FIGS. 17 and 34, the transverse channel 262 of the slide valve registers with sequence storage channel 13 so that the elements 17 and 19 progress past the slide valve unimpeded. When the slide valve is withdrawn to the position shown in FIGS. 32 and 33, channel 13 is blocked. The transverse channel 262 then registers with a notch 263 in the cover plate 16 whereby any ball (17 or 19) which is in channel 262 at the time can readily be made to fall through the notch by tipping the module. With the module tipped in the opposite direction, a substitute ball will be retained in channel 262 and can be incorporated in the sequence of channel 13 simply by pushing the slide valve back to the positions of FIGS. 17 and 34.

In some applications, it is desired that the control signal be continuous when successive ones of the storage elements are conductive, in which case a make-before-break switching assembly such as that shown in FIG. 12 may be used in place of the break-before-make switching assembly shown and described in connection with FIGS. 1 and 2.

Referring to FIG. 12, there is shown a switching assembly 200 for use with the drive sprocket 27 and which comprises a pair of contact terminal members 202 and 204 which are generally L-shaped and include depending terminal portions 202a and 204a, respectively. The contact members 202 and 204 are suitably mounted on the associated base plate by means of a plurality of mounting screws 206. The contact members 202 and 204 are identical, and therefore, only the member 202 is described in detail. As best shown in FIG. 13, the contact members 202 have an offset portion 208 extending into a slot 210 provided in the associated base plate. The member 202 includes a reversely bent portion having a pair of convex areas 212 and 213 spaced apart by the center-to-center distance of a pair of balls in adjacent slots in the associated sprocket 27. Intermediate the contact areas 212, 213 is a concave portion 216 corresponding in radius to the curvature of the associated storage balls. A detent for holding one ball in place in engagement with the concave contact surface 216 is thus provided. The distance between the center of the concave portion 216 and the marginal edges of the contact portion of the member 202 is less than the distance between adjacent balls so that when none of the balls is located within the recess 216 neither of the adjacent balls can be in contact with the member 202. It may thus be seen that as the sprocket 27 rotates to move a conductive ball out of the sensing position in the recess 216, such ball remains in engagement with the contact members 202 and 204 until the next ball has been moved into engagement with these two contact members. Accordingly, if the next ball is a conductive ball, the circuit continuity is maintained during the stepping from one ball to the next.

There are many applications such as control systems using fluidic logic components where low pressure pneumatic flow must be controlled in accordance with a preset program and several features of the present invention find application in such a programmable fluidic controller. In FIG. 15, there is shown a program controller of the present invention which has been designed to control the flow of fluid. In this embodiment of the invention, the same drive mechanism including the drive sprocket 27 may be employed and, if desired, the same switching assembly including the contacts 44a and 44b and the ball sets 47 and 48 may be employed for providing a detent arrangement as well as for enabling an electrical output signal should such be desired. Unlike the embodiment of the invention shown in FIG. 1, however, the mechanical storage elements are cylindrical and include a plurality of solid balls or cylinders 220 and a plurality of cylinders 222 which are provided with a bore extending from the base to the top of the cylinder. Additionally, one or the other of the groups of storage elements may be conductive. In the embodiment illustrated in the invention, the cylinders 220 are non-conductive and the cylinders 222 are conductive. However, the reverse situation may be employed if the application so dictates. As thus far described, it may be seen that the electric circuit between the contacts 44a and 44b is completed whenever a cylinder 222 is located in the sensing position between the upper balls of the contact ball pairs 47 and 48.

In order to provide a fluid signal whenever one of the hollow cylinders 222 is located in the sensing position there is provided in the base plate 226 a nozzle 228 having an end orifice 230 whose diameter is less than the diameter of the bores 223 in the cylinders 222. The orifice 230 is located directly opposite to an outlet port 231 provided in an associated cover plate 232. Suitable ducts 234 and 236 are connected to the nozzle 228 and the outlet 231, respectively.

In operation, when a cylinder 222 is located in the sensing station between the ball pairs 47 and 48, the bore 223 thereof is directly opposite to the nozzle 228 so that the fluid flow is directed through such bore into the outlet 231. When, however, a solid cylinder 220 is located in the sensing station, fluid flow to the outlet 230 from the nozzle 228 is impeded. In this manner, as the sprocket 27 is rotated the flow of fluid through the duct 238 varies in accordance with the program set up in the controller by the relative disposition of the solid and hollow cylinders 220 and 222 in the guideway.

Reference has been made to the fact that any desired number of program controllers can be operated concurrently from a single shaft. As best shown in FIGS. 17 to 19, each of the controllers 10 comprises a separate module 300 having a channeled plate 12 and a cover plate 16. Each module has its own base 302 and the several bases have dowels 303 which register with respective sockets 304 in associated modules 300 or with respective end plates 305 or 306, as the case may be. The respective bases 302 and the end plate 306 are provided with bearings for the hubs 307 of gears 308 which have polygonal openings to receive the operating shaft 310. The shaft itself has bearings in the end plates 305, 306, the latter having bosses fitted into the flanged supports 311 and 312 (FIGS. 19 and 20).

Each base 302 has contact springs 313, 314 which are individual to it and has terminals 315, 316 leading therefrom.

Each module 300 may comprise an integral unit as shown in FIG. 1, or may comprise a series of sections as shown in FIGS. 4, 5 and 6. In any case, the module is mounted detachably on its respective base 302. In a convenient arrangement preferred for such mounting, the base has an upstanding arm at 318 with a hook 319 engaged with a shoulder 320 with which the module is provided at one side. At its other side, the module has a similar shoulder at 321 and the base has a spring catch 322 mounted on the eccentric hub 323 of a manually operable latch lever 324. In the position shown in FIG. 17, the spring catch 322 is engaged over the shoulder 321 of the module 300 and the lever 324 is so positioned as to engage the spring catch 322 externally, its hub portion 323 having its eccentricity so disposed as to draw the spring catch tightly against the shoulder 321.

In the position of the parts shown in FIG. 18, the lever 324 has been oscillated about its pivot stud 325 to displace angularly the eccentric 323 upon which the spring catch 322 is pivoted. This releases the tension on the catch to permit its ready withdrawal from shoulder 321 of the module so that the module may now be tilted from the position of FIG. 17 to that of FIG. 18. Its shoulder 320 may now be disengaged readily from the opposite hook 319 so that the module may be lifted from the base.

To replace the module on the base, it is only necessary to hook its shoulder 320 beneath hook 319 and to force the conductors 327 downwardly to deform the springs 313 and 314, thereupon engaging the spring detent 322 over the hook 321 and oscillating lever 324 to cause its eccentric hub 323 to tension the spring detent. Optionally, a finger 329 is provided on the lever in a position to be engaged beside the spring detent 322 for greater security. In any event, the remounting of the module on the base re-establishes all electrical connections so that when the shaft 310 is inserted, the device is in condition to function.

The springs 44 of the module cooperate with the electrically conductive balls 45a and 45b in the same manner already described so that a bridging connection between springs 44 is established when an electrically conductive element 17 is at the sensing station in contact with the uppermost balls 45a and 45b. A circuit is established between the respective springs 44 of the module and the respective terminals 315 and 316 of the base by means of the conductors 327 which are mounted on bosses 328 of the base 12 where they are engaged by the springs 44 and are also in engagement with the spring contacts 313 and 314.

The mechanical driving connection between the shaft 310 and the star wheel 27 of the respective module is also established and broken merely by attaching the module to the base or removing it therefrom. As best shown in FIGS. 17 and 19, each of the driving gears 308 on shaft 310 meshes with a driven gear 295 which is provided with a squared and slotted shank 296 expanded by screw 297 to be held tightly in the hub 298 of the star wheel 27 of the respective module. Thus, no matter how many modules may be assembled in the manner shown in FIG. 19, the several bases can remain in assembly for operation of their several gears 308 by a single shaft 310, while permitting the control signal storage units to be detached and restored both electrically and mechanically simply by removing them from, or plugging them into, their respective base units by manipulating the hooks above described.

Any desired number of modules and bases may be assembled side by side as shown in FIG. 19 and held by any appropriate means such as the bolts 330 shown in FIG. 17.

As shown in FIG. 23, each of the modules 350 comprises a base plate 351 and throughout the series the channel 13 of each base plate is closed by the next base plate instead of requiring a cover plate 16, as in FIG. 3. Only the terminal channel 13a requires a separate cover plate 16a.

The short drive shaft 352 engages the hub 353 of star wheel 354 only, this hub being journaled, in part, in the base plate 351 of the first module and, in part, in the cover plate 16a above mentioned. The elements 17, 19 traversing channel 13a are propelled by the star wheel 354 past the sensing station 355 in the manner above discussed. As already explained, when a nonconducting element 19 is at the sensing station in contact with the balls 45a and 45b, the circuit between the springs 44a is open. A conductive ball 17 at the sensing station will serve as a bridging contact between balls 45a and 45b to close the circuit between the springs 44 and the terminals 357 which are electrically connected therewith.

As best shown in FIG. 23, the driven star wheel 361 has its own polygonal shaft 363 engaged in the hub 364 of a star wheel 365 which is in the next module (FIGS. 22 and 23). This star wheel is likewise shown as having ten ball-receiving spaces but, as shown, it has but a single tooth ball 366. Thus, a complete rotation of the driven star wheel 361 is required in order to advance the star wheel 365 for the angle represented by its single ball 366. (Any other number of balls can be used to produce a corresponding number of steps of advance.) Thus, since ten balls have to pass the sensing station in order to rotate the driven star wheel 361 for one complete rotation, and since ten rotations of star wheel 361 are required before the single tooth-ball 366 will make one complete revolution with its star wheel 365 to affect a single step advance of star wheel 370, it follows that the star wheel 370 will advance a ball past its sensing station only once for every ten balls of the first module.

In addition to the star wheel 365 which drives star wheel 370 through the hypothesized single ball 366 as above described, there is also a driven star wheel 371 which receives motion from star wheel 370 in the same manner in which star wheel 361 receives motion from star wheel 354. As clearly shown in FIG. 22, the star wheel 371 is offset angularly from star wheel 365. It has its own polygonal drive shaft 373 which actuates another ball star wheel comparable to wheel 365, to drive the primary star wheel of the next module. Assuming that star wheel 365 also has but one ball, it will thereupon advance a ball through its sensing station only once in every passage of one hundred balls through the sensing station of the first module. By alternating the positions of the driven star wheels having ten balls and the intermediate star wheels having less than ten balls, motion is communicated through the whole series of modules with no interference.

By using more than one ball in star wheel 365, or its successive counterparts, there will be a corresponding number of steps of advance through the next sensing station. Thus, the device is in effect, a bi-directional counter which can be adjusted to add or subtract (depending on direction). Using a binary system, the modules may be assembled with four modules per digit, with ten to one transfer from each group to the next.

For operating electric signs and for other similar purposes requiring parallel output, it may be desired to have a multiple switch plurality controller as shown in FIG. 24. For this purpose, the actuator would control all circuitry in each step of advance (90° in this exemplification). In this instance, the star wheel 375 is electrically conductive, being supplied with current through the live contacts 376. Two are shown solely for the purpose of reducing current density, dividing the current between two paths. The balls are arranged in the desired sequence in the channel 13 exactly as previously described. However, there are many sensing stations. One sensing station is shown at 378 where the ball 17 or 19 registers with the contact balls 48 bearing on the spring contact 379. Similarly at station 380 the ball 17 or 19 registers with contact balls 48 which are supported on the spring 381. At station 382, the ball 17 or 19 bears on the contact ball which rests on the spring contact 383.

In like manner, additional sensing stations may be provided for any reasonable number of contact springs, the springs respectively having terminals 384 to be energized through the live star wheel 375 and such electrically conductive balls as establish contacts between star wheel 375 and the respective contact balls of the respective springs. Obviously, any program set up in the balls in channel 13 will activate successively the several circuits established through the respective springs. Thus, as an example, a whole series of electric signs in different locations may be made to flash corresponding messages through the operation of program controllers functioning either singly or in multiple, as may be desired.

FIGS. 25 to 28 show a different type of multiple switching arrangement in which the channel plate 395 carries two sets of springs 400 and 401 to provide for two separate sensing stations at 403 and 404 respectively. The channel 405 traversed by the program elements may be entirely annular surrounding the star wheel 406 or it may have loops at 407 and 408 providing for additional storage. Each of the loops is defined in part by a crescent-shaped boss 409 adapted interchangeably to receive one of the inserts 410 or 411. The insert 410 has an arcuate surface 412 which is concentric with the star wheel 406 and completely spans the channel 407 so that when this insert is used, the balls are constrained to move with the star wheel. No loop remains. The insert 411, on the other hand, is smaller. It too has an arcuate surface at 414 which is concentric with the star wheel but its arcuate extent is less so that the loop 408 remains open at either side of the device at which an insert such as 411 is in use.

In the case of insert 411, the arcuate surface 414 immediately abuts the apices of the teeth of the star wheel, thus constraining all of the elements to traverse the loop 408. Conversely, the arcuate surface 412 of insert 410 is at a greater radius and leaves room for the balls or other elements to move with the star wheel as shown in FIG. 26.

As already described, the elements may be introduced in any sequence. As each element reaches one of the sensing stations 403 or 404, it will either establish a bridging circuit between the ball contacts of the respective springs, or if it is non-conductive, it will leave the circuit between the springs open.

The base 395 has a cover plate 415 which has a ball-receiving opening 416 leading from and into the channel 405. Since the device is duplex, it is desirable that balls may be exchanged at points at both sides in the approach to respective sensing stations. In each instance, it is preferred to provide a counterbore 417. A plug 418 is received detachably in the bore and integrally carries spring arms 419 which fit frictionally into the counterbore to retain the plug removably in position while permitting its ready removal to give access to one of the elements therebeneath.

In this arrangement, the channels traveled by the respective elements can be extended or contracted by the addition or removal of loops as desired. Since a closed path is provided in this embodiment, it is necessary that the length of channel be related to the length of the particular sequence of program-controlling elements. However, in each circuitous travel of the device by the elements of the program-controlling sequence, two separate sets of contacts will be energized and de-energized in like manner.

It is to be understood that the generic invention is not limited to the use of either electrically conductive elements or element which are permeable by a fluid. To exemplify further alternatives, FIGS. 35 to 37 are included.

These views further illustrate the fact that some elements can be cylindrical and others spherical and still will function saitsfactorily provided they are of like extent longitudinally of the channel in which they move.

FIGS. 35, 36 and 37 show intermingled cylindrical elements of one type and spherical elements of another type and they are of like extent along the channel because they are of like diameter.

In the embodiment of FIGS. 35 and 36, the channel 13 has in its elements 17c which are magnetized and elements 19c which are non-magnetic. For convenience, the elements 17c of this particular embodiment are cylindrical, although the elements 19c, which may either be of non-magnetic metal or resin are spherical. At the sensing statio 420, the star wheel 27 moves the successive elements between fingers 421 and 422 which are spaced therefrom. As clearly shown in FIG. 36, it is unnecessary that the element at the sensing station be in physical contact with either of the fingers 421 or 422.

The fingers 421 and 422 are made of maagnetizable material and have arms 423, 424 respectively connected with magnetizable and electrically conductive terminal rods 425, 426 of the conventional reed switch 430. The switch has normaally open contacts 432 and 433 which close when magneticaally energized by one of the magnetic elements 17c between fingers 421 and 422. This arrangement creates in the circuit which includes switch 430 a pulse every time one of the magnetic elements passes the sensing station 420. When one of the non-magnetic elements 19c is in the sensing station, the reed switch 430 remains open and no signal results.

Similar operation follows with the device of FIG. 37 in which a proximity switch functions in a standard circuit. The switch elements 17d are metallic (but not necessarily magnetic) while the element 19d may be made of synthetic resin or other material having a dielectric effect notably distinct from that of the element 17d. Again, the elements 17d are shown as cylinders and the elements 19d are shown as balls of like diameter. However, all of the said elements of FIG. 37 may be either cylindrical or spherical, as desired.

In any event, fingers 440 and 441 are provided at opposite sides of the sensing station 420 in a manner comparable to that shown in FIGS. 35 and 36. Again, there is no need for contact between these fingers and the elements passing the sensing station. The circuit includes an input line 444 connected by a lead 446 with the finger 441. The other side 448 of the input line is connected through variable capacitance 450 with the finger 440. Connected across the lines 444 and 448 is a load 454 in series with an SCR tube 456. The line 458 connected between the SCR tube and the line 442 includes a firing device 460 which is conventionally illustrated.

It may comprise a Diac or Thyratron. A resistor 462 is connected from line 448 to a point on line 458 intermediate the SCR tube 456 and the firing device 460. The circuit is a well known proximity switch circuit.

When there is a dielectric element 19d at the sensing station 420, the capacitance 450 is dominant in line 448 and the firing device 460 remains inactive. When a metallic element 17d is at the sensing station, its equivalent effect on the circuit is represented by the capacitance C2(464) which is shown in dotted lines. The effect is to reduce or offset the effect of capacitance C1(450), thus giving a readable signal or effect through load 454.

While the present invention has been described in connection with particular embodiments thereof, it will be understood that those skilled in the art may make many changes and modifications without departing from the true spirit and scope of the invention, and, therefore, it is intended by the appended claims to cover all such changes and modifications which fall within the true spirit and scope of the invention.

I claim:

1. In a control device, the combination of means for establishing a sensing station, guideway means leading to said station, a set of control elements movable in said guideway means toward said station and being of substantially identical extent in direction of movement in said guideway means, said elements being of plural types and including a first type distinguished by a detectable physical property which is absent from elements of another type, said elements being disposed in a predetermined sequence in said guideway means, means for controlled advance of said elements, and means at the sensing station responsive to said property for detecting the presence at said station of an element of the first type, the respective elements being cylindrical and of like circular cross section in the plane of their advance in the guide way means, and some of the elements being tubular, the means at the sensing station for detecting the presence of a tubular element comprising means for establishing a pressure differential transversely of the guideway means, and means responsive to pressure differential communicated through a tubular element for giving a signal.

2. A program controller according to claim 1 in which the means providing the guideway constitutes a member having a channel which serves as said guideway and which is located in spaced relation to a margin of the member, said member further having a transverse slot intersecting said channel and opening to said margin, a slide reciprocable in said slot between normal and retracted positions, said slide having a transverse channel sufficiently dimensioned to receive a control element and constituting a part of said guideway when said slide is in its normal position and which transverse channel is exposed in the retracted slide position for withdrawal and replacement of one of said elements, the slide in said retracted position blocking the guideway against movement of elements across said slot.

3. In a control device, the combination of means for establishing a sensing station, guideway means leading to said station, a set of control elements movable in said guideway means toward said station and being of substantially identical extent in direction of movement in said guideway means, said elements being of plural types and including a first type distinguished by a detectable physical property which is absent from elements of another type, said elements being disposed in a predetermined sequence in said guideway means, means for controlled advance of said elements, and means at the sensing station responsive to said property for detecting the presence at said station of an element of the first type, the means for establishing a sensing station comprising a base and the guideway means leading to said station comprises a channeled member detectably mounted on the base, the base having channels registering with channels of said guideway member, the sensing station comprising a switch contact for which the elements of the first type constitute actuators, the said member being provided with a recess to and from which the channel thereof leads, and a star wheel in the recess constituting means for controlling the advance of elements individually past said contact, said wheel closing the channel of said member upon removal of said member from said base.

4. In a control device, the combination of means for establishing a sensing station, guideway means leading to said station, a set of control elements movable in said guideway means toward said station and being of substantially identical extent in said guideway means, said elements being of plural types and including a first type distinguished by a detectable physical property which is absent from elements of another type, said elements being disposed in a predetermined sequence in said guideway means, means for controlled advance of said elements, and means at the sensing station responsive to said property for detecting the presence at said station of an element of the first type, said guideway means including a member having a first guideway channel leading to said sensing station and a second guideway channel leading from said sensing station, and further having hoppers for the respective types of elements, means whereby elements in the second guideway channel are sorted into respective hoppers, and means for delivering elements from respective hoppers into the first mentioned channel to establish said predetermined sequence, the elements of said first type being formed of magnetic material, and the elements of said second type being formed of non-magnetic material, and said sorting means including a permanent magnet mounted adjacent said channel between said hoppers, and means for establishing separate paths of movement for the magnetic and non-magnetic material leading to different hoppers.

5. In a control device, the combination of means for establishing a sensing station, guideway means leading to said station, a set of control elements movable in said guideway means toward said station and being of substantially identical extent in said guideway means, said elements being of plural types and including a first type distinguished by a detectable physical property which is absent from elements of another type, said elements being disposed in a predetermined sequence in said guideway means, means for controlled advance of said elements, and means at the sensing station responsive to said property for detecting the presence at said station of an element of the first type, said guideway means including a member having a first guideway channel leading to said sensing station and a second guideway channel leading from said sensing station, and further having hoppers for the respective types of elements, means whereby elements in the second guideway channel are sorted into respective hoppers, and means for delivering elements from respective hoppers into the first mentioned channel to establish said predetermined sequence, said last means including a slide valve movable between two positions and having a cavity which in one of said positions registers with a hopper to receive an element therefrom and in another of said positions registers for delivery of said element to the channel which leads to the sensing station.

6. A control device according to claim 5 in which said slide has an arm projecting into the hopper and adapted to agitate elements therein during each operation of such slide.

7. A program controller for producing time displaced control signals in accordance with a desired program, comprising
a base,
a pair of mutualy insulated switch contacts mounted on said base comprising springs oppositely directed in substantial parallelism with the direction of ball movement and having free ends in spaced-apart relation in the direction of ball movement,
a plurality of electrically conducting circular elements, a plurality of electrically non-conducting circular elements, said elements all being of diameter which is at least sufficient to bridge said contacts, and stepwise operated means for feeding said elements in predetermined ordered sequence into contact engaging position between said contacts and for removing said elements from said position, whereby said contacts are electrically interconnected whenever one of said conducting elements is in said position between said contacts and said contacts are electrically disconnected whenever one of said non-conducting elements is in said position.

8. Electric signal producing apparatus according to claim 7 and further comprising a housing having a ball reeciving channel therein,
the feeding and removing means comprising a sprocket rotatably mounted in said housing adjacent said sensing station, the contacts comprising a pair of mutually insulated conductive contact balls mounted at said sensing station, and resilient means urging said contact balls toward said sprocket to cause said contact balls to contact the one of said plurality of elements in said sensing station.

9. A program controller comprising a housing, a guideway extending through said housing, a continuous tube removably connected at its ends to the respective ends of said guideway, a plurality of free storage elements disposed in said tube and said guideway, a drive means rotatably mounted in said housing adjacent to said guideway for moving said balls along said guideway, and sensing means mounted on said housing adjacent to said guideway for providing signals in response to a physical characteristic of certain ones of said balls passing thereby.

10. A plurality of like control devices in separable modular form, each including a guideway, elements movable in the guideway and of types having distinguishable characteristics, a sensing station for reading characteristics of one type, and a star wheel controlling movement of said elements; and a common shaft with which the several star wheels of the several devices have driven connection, whereby to provide a plurality of series of control signals relative to a common time base.

11. A control device according to claim 10 in which the star wheel of the first modular device has a driving shaft and said first device has an incremental transfer star wheel in which a selected number of elements register with intertooth spaces of the star wheel of the first of said devices to receive motion therefrom, the second said star wheel having an intergeared connection with the star wheel of the second such device.

12. A control device according to claim 11 in which each of said modules has recesses at opposite sides of its first said star wheel, one of said recesses containing a driven star wheel and the other a driving star wheel, the said driving and driven star wheels alternating in position in the respective recesses in the successive modules.

13. In a control device, the combination with a base having electrical terminals, a shaft provided with a driving gear, a control modulus provided with a driven gear and including means for detachably connecting it with said base with said gears in mesh, electrical contact means connected with said terminals and means on the modulus for controlling electrical connection between said terminals when the modulus is assembled on the base.

14. A control device according to claim 13 in which said last means comprises means on the modulus providing a guideway, elements relatively electrically conductive and non-conductive and movable in the guideway, the several elements being disposed in a predetermined sequence in the guideway, a star wheel having intertooth spaces fitting the elements and engaged with certain thereof for the control of element movement in the guideway, said driven gear being connected with said star wheel and meshing with the driving gear when the modulus is assembled to the base, the conductive elements being sufficiently extensive to bridge between said contact means and thereby to complete a circuit between said terminals when said modulus is assembled to the base and when a conductive element registers with the contact means.

15. A control device according to claim 14 in which the contact means comprises specimens of said conductive elements mutually insulated from each other and disposed in channels communicating with the guideway and with which said modulus is provided, and springs supporting the said specimen elements constituting said contact means and urging them toward the guideway to be engaged by successive elements traversing the guideway.

16. A control device according to claim 14 in which a plurality of like bases are assembled in side-by-side relationship and the shaft extends therethrough and is provided with a separate gear for each such base, and separate moduli like the modulus first mentioned are individually and separately clamped to the successive bases, each having a driven gear engageable and disengageable from the gear of the respective base as the modulus is mounted on and dismounted from the respective base.

17. A control device according to claim 14 in which the base and modules are provided at one side with a hook portion and a complementary portion engageable in the assembly of the modulus on the base, the base and modules being provided at the opposite side with means for holding them in assembly and comprising a spring tensioned catch and a seat.

18. A control device according to claim 17 in which the spring catch has a pivot and an eye upon which the catch is oscillatable to and from the seat, said pivot comprising a rotatably mounted eccentric encircled by said eye and provided with an operating lever for oscillation of the eccentric in directions to increase and decrease the tension of said catch upon said seat.

19. In a control device, the combination of a plurality of modules each including a plate having front and rear faces and having a channel in its front face providing a guideway for control elements, the plate of one module having its rear face closing the channel in the front face of an element behind it, control elements of at least two different types movable in the respective channels, means establishing a sensing station past which said control elements are movable, means at said station for determining the presence therein of an element of one of said types, a first star wheel on each module controlling the movement of said elements and having a mounting on said plate, a second rotatable star wheel on each module in proximity to the first star wheel and having at least one element engaged between the teeth of the respective star wheels to constitute a tooth for the transmission of motion from the first star wheel to the second star wheel, the next consecutive module having a third star wheel with which the second star wheel has driving connection, the third star wheel having at least one of said elements engaged between its teeth and those of the first star wheel of the next module and constituting means for the driving of the first star wheel of said second module.

20. In a control device, the combination of a plurality of modules each including a plate having front and rear faces and having a channel in its front face providing a guideway for control elements, the plate of one module having its rear face closing the channel in the front face of an element behind it, control elements of at least two different types movable in the respective channels, means establishing a sensing station past which control elements are movable, means at said station for determining the presence therein of an element of one of said types, a first star wheel on each module controlling the movement of said elements and having a mounting on said plate, a second rotatable star wheel on each module in proximity to the first star wheel and having at least one element engaged between the teeth of the respective star wheels to constitute a tooth for the transmission of motion from the first star wheel to the second star wheel, the next consecutive module having a third star wheel with which the second star wheel has driving connection, the third star wheel having at least one of said elements engaged between its teeth and those of the first star wheel of the next module and constituting means for the driving of the first star wheel of said second module, successive modules having the second and third mentioned star wheels in alternating position at opposite sides of their respective first star wheels.

21. A control device according to claim 19, and comprising a plurality of sets each of four successive modules and having motion transmitting connection between the modules of each set and having motion transmitting connection from the first set of four to a successive set of four, the said elements being programmed according to a binary code and the assembly being adapted to function as a counter having the characteristics of a non-ambiguous positional transducer.

References Cited

UNITED STATES PATENTS

| 1,620,638 | 3/1927 | Faller et al. | 200—52 |
| 2,006,999 | 7/1935 | Nachumsohn | 200—46 |
| 2,275,436 | 3/1942 | Holcomb | 178—17 |
| 2,343,297 | 3/1944 | Holcomb | 178—3 |
| 2,406,031 | 8/1946 | Parker | 178—22 |
| 2,832,826 | 4/1958 | Hagelin | 178—17 |

FOREIGN PATENTS 28,834  12/1913  Great Britain.

BERNARD A. GILHEANY, Primary Examiner

R. L. COHRS, Assistant Examiner

U.S. Cl. X.R.

178—3, 17, 22; 200—52

PO-1050
(5/69)

UNITED STATES PATENT OFFICE
CERTIFICATE OF CORRECTION

Patent No. 3,470,338    Dated September 30, 1969

Inventor(s) Robert H. Ahrens - Milwaukee Chaplet & Mfg. Company

It is certified that error appears in the above-identified patent and that said Letters Patent are hereby corrected as shown below:

| | |
|---|---|
| Column 8, Line 24, | "channesls" should be --channels-- |
| Column 12, Line 26, | "none" should read --one-- |
| Column 16, Line 37, | "statio" should be --station-- |
| Column 16, Line 42, | "maagnetizable" should be --magnetizable-- |
| Column 16, Line 47, | "magneticaally" should be --magnetically-- |
| Column 17, Line 73, CLAIM 3, | "detectably" should be --detachably-- |
| Column 18, Line 70, CLAIM 7, | "mutualy" should be --mutually-- |

SIGNED AND
SEALED
MAY 12 1970

(SEAL)
Attest:

Edward M. Fletcher, Jr.
Attesting Officer

WILLIAM E. SCHUYLER, JR.
Commissioner of Patents